United States Patent [19]

Bernard

[11] Patent Number: 4,935,812

[45] Date of Patent: Jun. 19, 1990

[54] METHOD FOR BROADCASTING HIGH DEFINITION TELEVISION PROGRAMS USING TEMPORAL ATTENUATION

[75] Inventor: Philippe Bernard, Cesson Sevigne, France

[73] Assignees: Etat Francais, Issy Les Moulineaux; Telediffusion de France, Paris, both of France

[21] Appl. No.: 269,606

[22] Filed: Nov. 10, 1988

[30] Foreign Application Priority Data

Nov. 12, 1987 [FR] France ............................... 87 15648

[51] Int. Cl.$^5$ .............................................. H04N 7/12
[52] U.S. Cl. ...................................... 358/133; 358/12; 358/141; 358/138
[58] Field of Search ................. 358/12, 138, 141, 140, 358/133, 13

[56] References Cited

U.S. PATENT DOCUMENTS

| 4,561,012 | 12/1985 | Acampora | 358/11 |
| 4,621,286 | 11/1986 | Reitmeier et al. | 358/12 X |
| 4,723,157 | 2/1988 | Wendland et al. | 358/12 |
| 4,785,348 | 11/1988 | Funsalas et al. | 358/12 X |

FOREIGN PATENT DOCUMENTS 0082489 4/1989 European Pat. Off. .

OTHER PUBLICATIONS

"Analyse et Structures de Sous-Echantillonnage Spatio-Temporel d'un Signal HDTV en vue de sa Transmission dans Canal MAC" HDTV Conference in Ottawa, Canada, Oct. '87.

Primary Examiner—James J. Groody
Assistant Examiner—Victor R. Kostak
Attorney, Agent, or Firm—Antonelli, Terry, Stout & Kraus

[57] ABSTRACT

For broadcasting an HDTV picture over a transmission channel having a frequency band narrower than that necessary for direct transmission of the HD TV picture, the HDTV source picture is sub-sampled at an analysis image frequency $f_o$ for distributing the spatial data of each HDTV image of the source picture over n successive frames, n being greater than 1. The resulting samples are subjected to temporal energy attenuating filtering in a frequency range around $fO/n$ to obtain a modified signal, which is sent over the transmission channel. Upon reception, the modified signal is subjected to temporal filtering for enhancing energy in the frequency range before subjecting it to decoding for restoring the HDTV picture.

9 Claims, 6 Drawing Sheets

METHOD FOR BROADCASTING HIGH DEFINITION TELEVISION PROGRAMS USING TEMPORAL ATTENUATION

BACKGROUND OF THE INVENTION

1. Technical Field

The invention relates to methods and systems for broadcasting high definition television programs, called HDTV, for providing an image having a much higher number of lines and pixels per line than in present standards. The European project EUREKA EU95 specifies for example an image at the frequency of 50 Hz, having 1250 lines instead of 625 lines and twice the number of pixels per line.

To avoid any ambiguity, it should be noted that an "image" is formed by several "frames" whereas in Great-Britain the notations "frame" for "image" and "field" for "frame" are often used.

It is important for the HDTV programs, at least during a transitory period, to be able to be transmitted over available broadcasting channels and received by existing receivers. In particular, the problem will arise of broadcasting HDTV programs over a MAC-packet television channel from a satellite. The MAC standard in fact fixes the channel width at 20.5 MHz, i.e. a value much less than that required for HDTV image transmission.

2. Prior Art

Different data compression processes have been proposed for reducing the bandwidth required for the HDTV image to the value which is available. These processes involve sub-sampling at transmission and interpolation at reception. Thus, a high definition image with low time activity (i.e. where the modifications are small from one image to the next) may be conveyed in a narrow transmission channel, by spreading the spatial data of an image over several successive television frames. Purely spatial shuffling techniques make it possible to broadcast all lines of a high definition image by scanning with a smaller number of lines. The left hand part of FIG. 2 shows a vertical shuffling technique applied to the standard structure of lines of the four frames shown in FIG. 1, samples x, o, y and a corresponding respectively to four successive frames numbered 1, 2, 3 and 4. Such a process for narrowing the required band is disclosed in European 0082,489. A wide band HDTV signal with sequential scanning is converted into an interlace scanning signal for transmission through a channel having a width which is too narrow for direct transmission of the sequential signal. Scanning conversion makes use of picture subsampling which may detrimentally affect the image. Spatio-temporal filtering is used for limiting the passband of the source signal and inhibiting the conversion defects. Low pass temporal filtering for limiting the amount of flicker completely removes high frequency information and makes it impossible to reconstruct it, even approximately, on reception.

But the sub-sampling and the shuffling are encoding operations which affect the quality of the "compatible" image, this term designating any image delivered by a first generation receiver (not deigned for receiving HDTV) fed via a transmission or broadcast channel with programs encoded by an HD encoder. The defects are due mainly to the aliasing due to subNyquist sub-sampling and to shuffling of the samples. Reference may be made in this connection to the article "Analyse de structures de sous-éhantillonnage spatio-temporel d'un signal TVHD en vue de sa transmission dans un canal MAC", HDTV Conference, Ottawa, October 1987.

The transmission of a stationary HD image over a reduced width channel results therefore, in particular, in time activity of the compatible image, which degrades it.

It might be thought that the compatible image could be improved by conventional spatial filtering methods. In fact, it appears that techniques for suppressing certain spatial frequencies cause a loss of spatial resolution in the compatible image, do not correct all the defects and have a low resistance to transmission noises. There continue to exist in particular certain effects of the sub-Nyquist sub-sampling, particularly aliasing and line scrambling effects which result in movements of the contours.

SUMMARY OF THE INVENTION

It is an object of the invention to provide a compatible image which is very much improved with respect to those which can be obtained with known methods of sub-sampling before transmission and interpolation upon reception as well as with use of spatial filtering techniques. It is based on an analysis which has shown that time filtering is likely to provide very substantial improvements, on condition that there remains, in the transmitted signal, some energy corresponding to the "folded" spectrum so as to reconstruct, at reception, an HDTV image with low time activity.

In other words, the invention uses the finding that the sub-Nyquist sub-sampling effects can be reduced, even possibly suppressed, by partial filtration of temporal energies corresponding to the energy in the "folded" spectrum, causing an attenuation which is a compromise between the quality of the compatible image and resistance to noise.

Obtaining an HD image with low time activity (this term including a stationary image) requires that a fraction of the folding energy be preserved.

On the other hand, an appreciable reduction of this energy is desirable removes the sub-Nyquist subsampling effect.

The invention provides then a method of broadcasting high definition television programs over a transmission channel having a capacity less than the spectral band of the image signal wherein: at transmission, sub-sampling of the image is carried out for distributing the spatial data over n successive frames (n being an integer greater than 1); and, at reception, interpolation filtering is carried out, characterized in that the high definition coded image is subjected to:

time attenuation filtering of the energy in the region close to $f_0/n$ ($f_0$ being the analysis frame frequency) after high definition coding and before transmission, and time enhancement filtering corresponding to the attenuation before high definition decoding at reception.

The method which has just been defined is only optimum for picture zones with limited time activity. In an advantageous embodiment of the invention, coding and attenuation (and correlatively enhancement and decoding) will be matched to the time activity of the image:

if the picture has low time activity, sampling of the image will be distributed over n frames. In practice, it may be considered that this condition is fulfilled for pictures whose time activity is between the planes $f_t = -50/2n$ Hz and $f_t = +50/2n$ Hz, $f_t$ representing the time frequencies of the image, assuming that the image rate is 50 Hz.

Typically, $n=4$ will be selected.

if the time activity is greater than the above limits, it will be advantageous to use a different sampling, either over a smaller number of frames, i.e. with n less than 4, or even over a single frame.

In the latter case, the spatial sub-sampling is less complex and the aliasing of the transmitted image is less troublesome. Shuffling also has less effect, the frequency contents of the image being weaker.

In a particular embodiment of the invention, the above-defined method will be applied only during the periods when the image has low time activity, where the folding energy is confined in the vicinity of the temporal plane $f_{0t}=50/n$ Hz. The harmonics, corresponding to multiples of $f_{0t}$, are less troublesome since the eye follows the low time frequencies preferentially.

To sum up, the method of the invention, applied during those time periods in which the image has low time activity, makes it possible to reduce the defects in the compatible image by preserving the data contained in the folding energy for reconstructing the HD image.

The invention also provides a system for implementing the above-defined method, comprising, in a broadcasting transmitter, an attenuator inserted between the high definition encoder and the transmission modulator and, in each receiver, an enhancement module inserted between the demodulator and the high definition decoder. A switching device will be advantageously inserted immediately downstream of the attenuator (or enhancement module) so as to send to the modulator (or to the decoder) either the image having undergone digital time attenuation, or a different signal, depending upon the temporal activity of the image.

BRIEF DESCRIPTION OF THE DRAWINGS

The invention will be better understood from reading the following description of a particular embodiment, given by way of example. The description refers to the accompanying drawings, in which:

FIG. 3 is a general block diagram of a broadcasting system implementing the invention;

FIG. 12 is a diagram showing the symbols used for describing the operation of the attenuation module of FIG. 8.

DETAILED DESCRIPTION OF PREFERRED EMBODIMENTS

Figure 1:
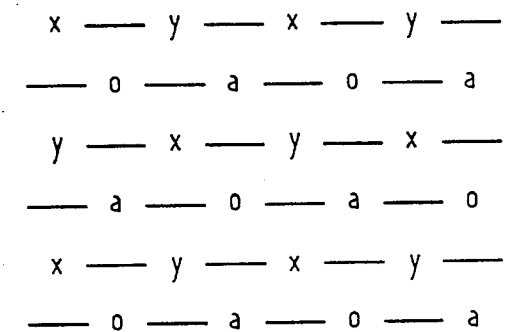
FIG. 1 already mentioned, shows an example of a stable quincunx structure of lines distributed over four frames, which may be used for a high definition television signal.
Figure 2:
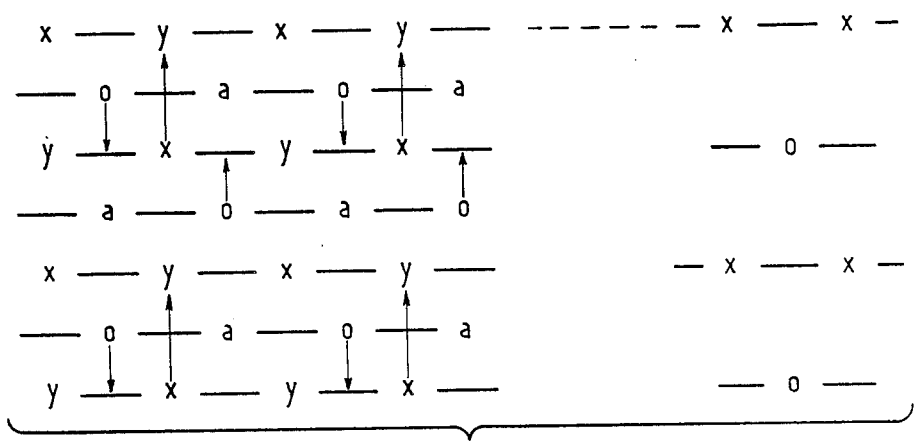
FIG. 2 is a diagram giving an example of shuffling of frames and sub-sampling.

By way of example, implementation of the method of the invention will be described in the case of an HD image with sub-sampling over $N=4$ transmission frames. In the case of an image with interlacing at 50 Hz, the image repetition period T is then 1/25 sec, with shuffling of lines by a factor 2. This sub-sampling and shuffling method is shown in FIG. 2: in the left hand part of the line, x, y, o and a designate again the samples in the frames of order 1, 3, 2 and 4, respectively, having a staggered structure. The arrows show line shuffling. The right hand part shows the samples transmitted for the set of frames 1 and 2; the other samples will be transmitted on frames 3 and 4. HD images may then be transmitted from a source with 1150 useful lines over a channel allowing 288 lines per transmission frame only.

Figure 4:
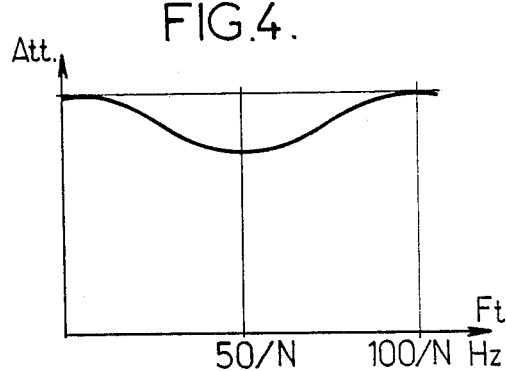
FIGS. 4 and 5 are examples of attenuation and enhancement filtering patterns, respectively.
Figure 5:
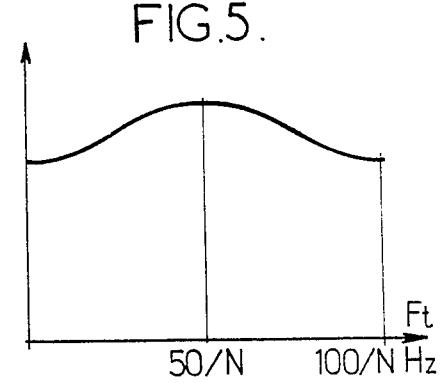

Attenuation and enhancement may both be provided by raised cosine filtering in accordance with the patterns of FIGS. 4 and 5, with a time aperture of three images for minimizing the complexity of a wired construction. However, the aperture could be higher, for example five images. Filtering takes place either over the even frames, or over the uneven frames, alternatively.

The attenuation may be written:

$$I_t(x,y,t) = a_0 I_o(x,y,t) + a_{-1} I_o(x,y,t-T) + a_1 I_o(x,y,t+T) \quad (1)$$

in which:

$I_o(x,y,t)$: initial value at the point of coordinates (x,y) and at time t, $I_t(x,y,t)$: value transmitted after attenuation at point (x,y) and at time t, with a = value of attenuation for $f_t$.

The values $a_0$ and $a_1$ are:

$$a_0 = (1+a)/2$$

$$a_1 = a_{-1} = (1-a)/4$$

If the value after enhancement at point (x,y) and at time t is designated by $I_r(x,y,t)$, the enhancement to be effected will be:

$$I_r(x,y,t) = b_0 I_t(x,y,t) + b_{-1} I_t(x,y,t-T) + b_1 I_t(x,y,t+T)$$

with $b_0 = (1+a)/2 \cdot a$ $b_{-1} = b_1 = (a-1)/4 \cdot a$

It remains to determine an optimum value coefficient a: the choice is made by taking into account the resistance to noise of an attenuation-enhancement system and of the visibility threshold of the defects of the compatible image. An attenuation of 6 dB at 12.5 Hz seems close to an optimum. However, in practice, the range is from 4 to 8 dB. It corresponds to $a=0.5$.

Then:

$$a_0 = 0,75$$

$$a_1 = a_{-1} = 0,125$$

$$b_0 = 1,5$$

$b_1 = b_{-1} 0,25.$

However, other values might be more advantageous for other channel widths.

The choice of the equation (1) will be suitable for sequences having low time activity, corresponding typically to movements having an order of magnitude of one pixel from one image to the next, or having no time activity. But a different processing is preferable at the beginning and at the end of low time activity sequences. Then, with the same symbols as for (1), it is possible to select:

for the first image $$\begin{aligned} a'_o &= a_o & b'_o &= b_o \\ a'_1 &= 2a_1 b'_1 &= 2b_1 \\ a'_{-1} &= 0 & b'_{-1} &= 0 \end{aligned}$$

for the last image $$\begin{aligned} a''_o &= a_o & b''_o &= b_o \\ a''_{-1} &= 2a_1 b''_{-1} &= 2b_1 \\ a''_1 &= 0 & b''_1 &= 0 \end{aligned}$$

A possible construction of the modules will now be described for achieving attenuation for transmission and enhancement at reception.

The general construction of the transmitter and of a receiver may be as shown in FIG. 3.

Figure 6:
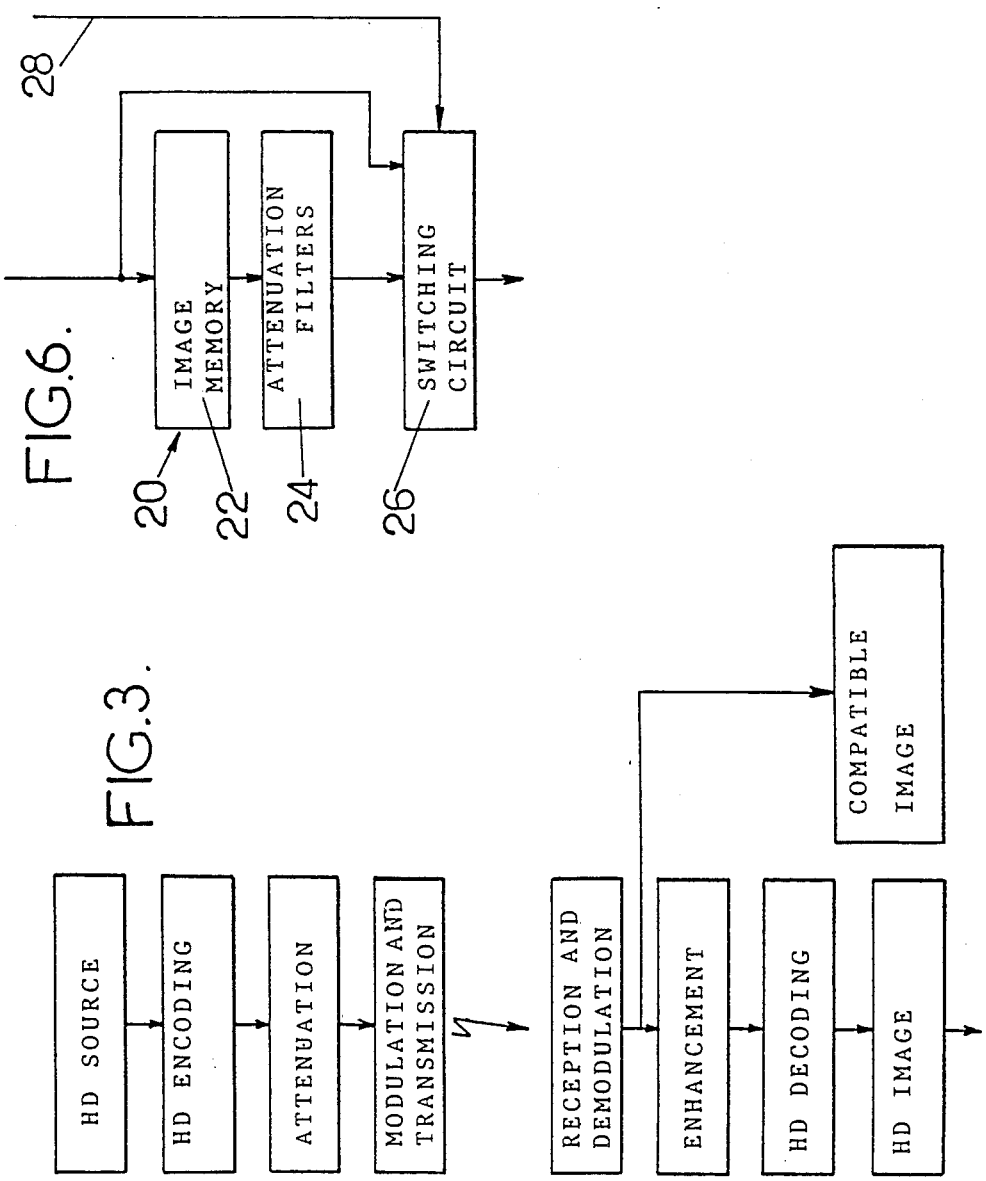
FIGS. 6 and 7 are diagrams showing the means for implementing the method of the invention at transmission and at reception, respectively.

The cascaded blocks of the transmitter shown in FIG. 3 represent an HD picture source, HD encoding circuits, an attenuation module shown in greater detail on FIG. 6 and conventional circuits for modulation and transmission.

Conversely, any receiver, whether of first generation or specifically designed for HDTV, includes reception and demodulation circuits.

On the other hand, an HDTV receiver for operating according to the invention differs from a conventional MAC receiver, described in numerous papers, by the presence of the enhancement means and HD decoding.

The attenuation module 20 shown schematically in FIG. 6 is intended to be inserted between the output of the high definition encoder and the modulator of a transmitter, for example a transmitter for broadcasting according to the MAC-packet standard. This last part will not be described since it is not concerned by the invention.

Module 20 comprises image memories 22, which will be described in greater detail later, made necessary by the time aperture of the attenuation filters 24 which follow the memories. The signal having temporal attenuation is transmitted to the modulator via a switching circuit 26 for handling the edge effects (in the time sense) and the situations with inadequate time activity, by means of movement data 28 delivered by the HD encoder, as described for instance in WO 87/04034 (Sandbank et al).

Figure 7:
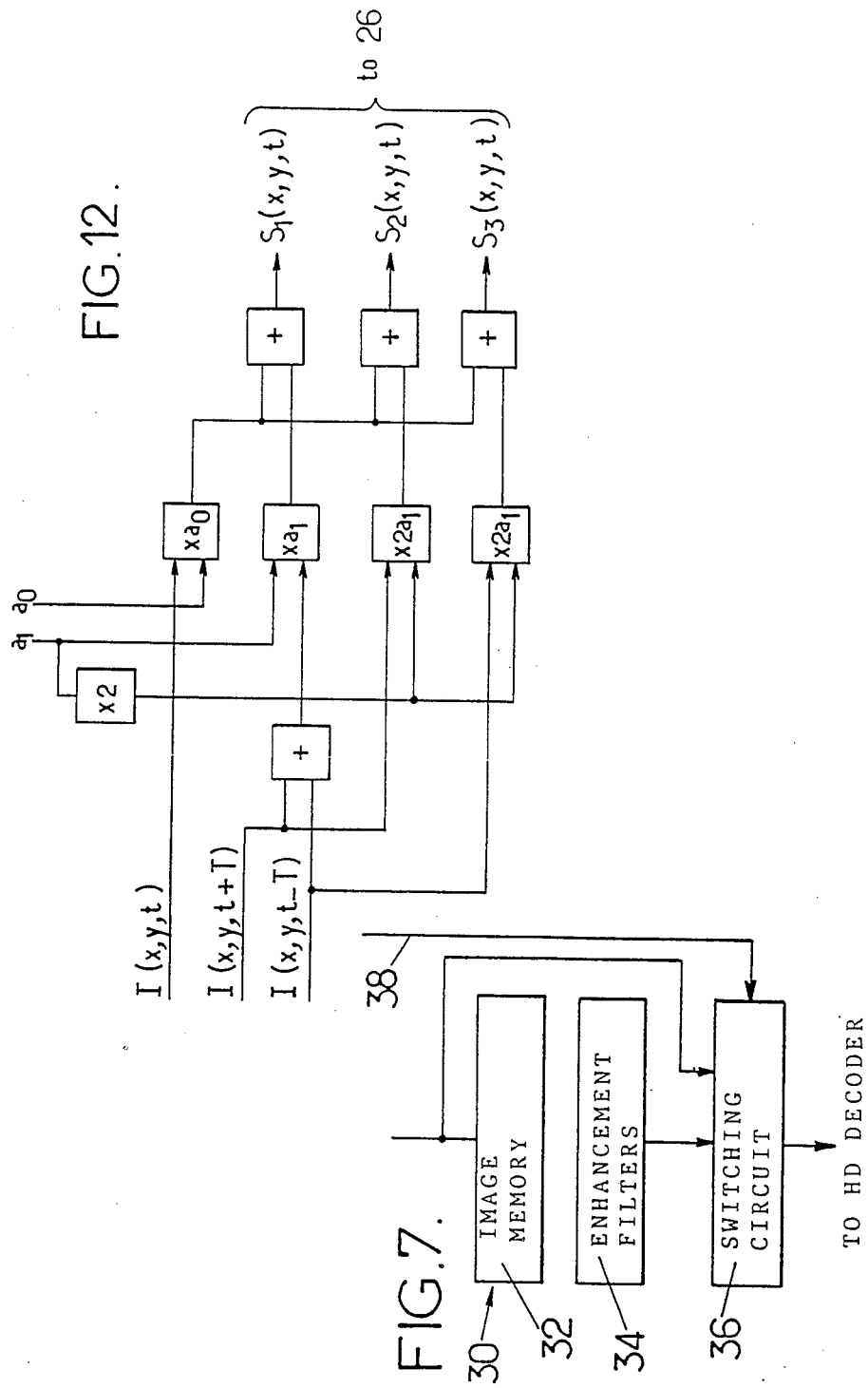

The enhancement module 30 (FIG. 7) has a construction similar to that of module 20: it comprises image memories 32 whose capacity depends on the time aperture of the enhancement filters 34 and a switching circuit 36 which handles the edge effects and the situations with inadequate time activity, through movement data 38 (assistance data) conveyed by the transmission channel or computed locally. The output of circuit 36 drives the HD decoder.

Figure 8:
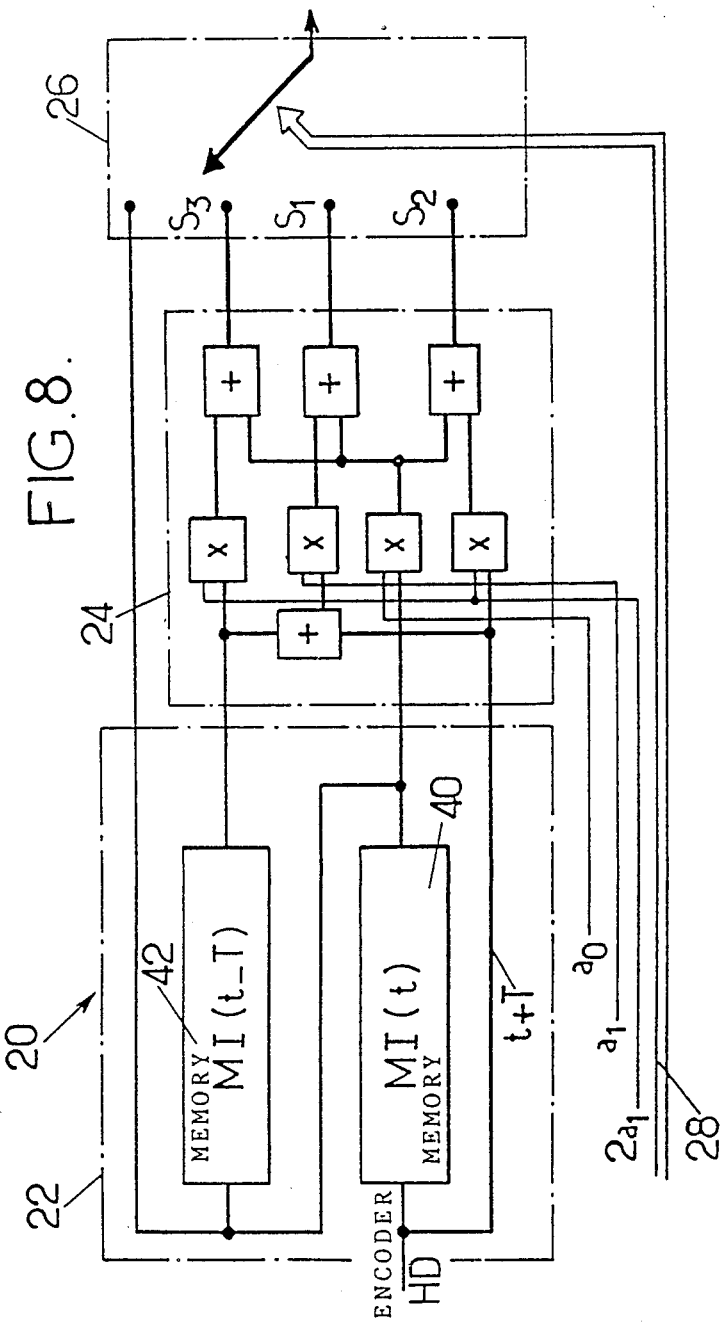
FIGS. 8 and 9 are detailed block diagrams of examples of attenuation and enhancement modules.

FIG. 8 shows the construction of the different components of the attenuation module 20 in the above-mentioned case of attenuation using three successive frames. The image or video memories 22 comprise two cascaded RAMs 40 and 42, assigned respectively to the images at times t and t-T (T being the repetition period of the even or uneven frames). The digital attenuation filter 24 is of the 1-2-1 type with three coefficients, using pixel-to-pixel correspondence in three successive temporal planes. It is formed of adders and multipliers in an arrangement providing weighting, which will be described later.

The first and the fourth multipliers of filter 24 multiply by $2a_1$ the data received by the encoder at time t and that received 2T before, respectively; the second multiplier muliplies by $a_o$ the data delayed by T; the third multiplier multiplies by $a_1$ the sum of the instantaneous data and of the data delayed by 2T.

Thus, the outputs $S_1$, $S_2$, and $S_3$ correspond to different temporal attenuations.

$S_1$: attenuation without edge effect.

This signal results from summing the signals taken at times t-T, t, t+T weighted by the respective coefficients $a_1$, $a_o$ and $a_1$.

$S_2$: attenuation upon beginning of a sequence

This signal results from summing the signals taken at times t and t+T weighted by the coefficients $a_o$ and $a'_1$, with $a'_1 = 2a_1$.

$S_3$: attenuation upon end of a sequence

This signal results from summing the signals taken at times t and t+T weighted by the coefficients $a_o$ and $a'_1$, with $a'_1 = 2a_1$.

The switching circuit 26 may be regarded as a switch for connecting the output of the attenuator to any one of the outputs $S_1$, $S_2$, $S_3$ of the filter 24 and to an unprocessed signal output, depending on the movement indicating data 28 delivered by the encoder.

The enhancement module (FIG. 9) has a construction similar to that of the attenuation module: it also comprises two video memories 44 and 46, due to the time aperture of the enhancement filtering. The enhancement filter 34 effects the same computing operations as the attenuator, but with different weighting coefficients $b_o$, $b_1$, $2b_1$. Switch 36 further provides switching between the three computer signals $S'_1$, $S'_2$, $S'_3$ and the original transmitted signal S, depending on movement data 38 delivered by the decoder.

The table of truth of switches 26 and 36 may be as follows, designating by $y_o$, $y_1$ and $y_2$ the output signals driving the switches:

|   | Not processed | Sequence beginning | Stabilized | Sequence end |
|---|---|---|---|---|
| $y_1$ | 0 | 1 | 1 | 1 |
| $y_2$ | 0 | 1 | 0 | 0 |
| $y_3$ | 0 | 0 | 0 | 1 |

Figure 10:
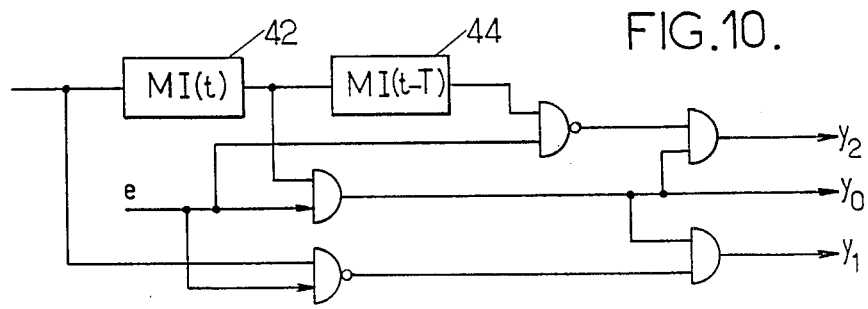
FIG. 10 is a block diagram showing a circuit for processing the movement data, so as to control the switch of FIGS. 8 and 9.

That table of truth may be constructed in the form of the circuit shown in FIG. 10 (e being the processing state corresponding to the time activity).

Figure 8A:
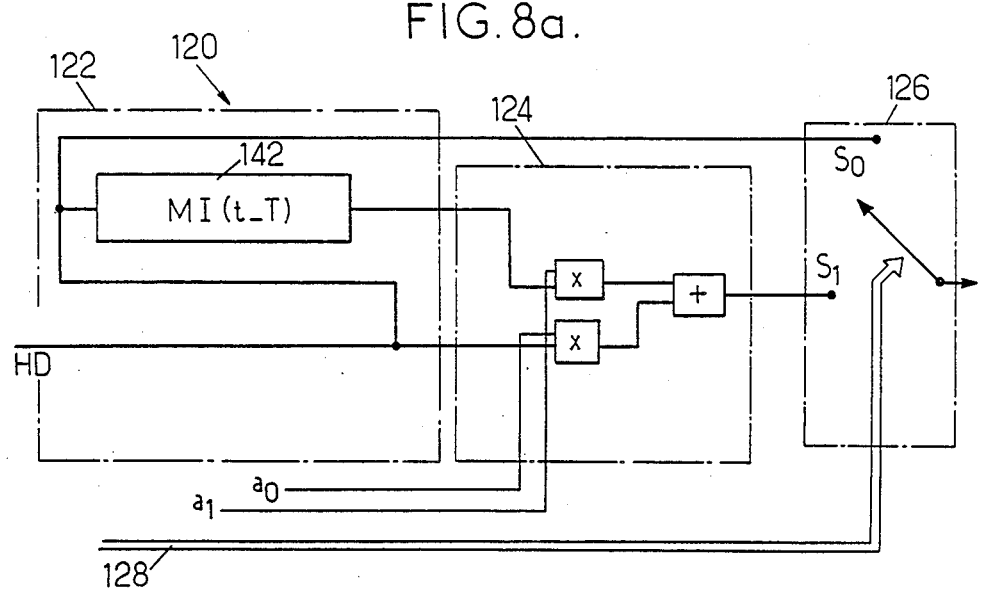
FIGS. 8a and 9a show a modified construction of the attenuation and enhancement modules.
Figure 9A:
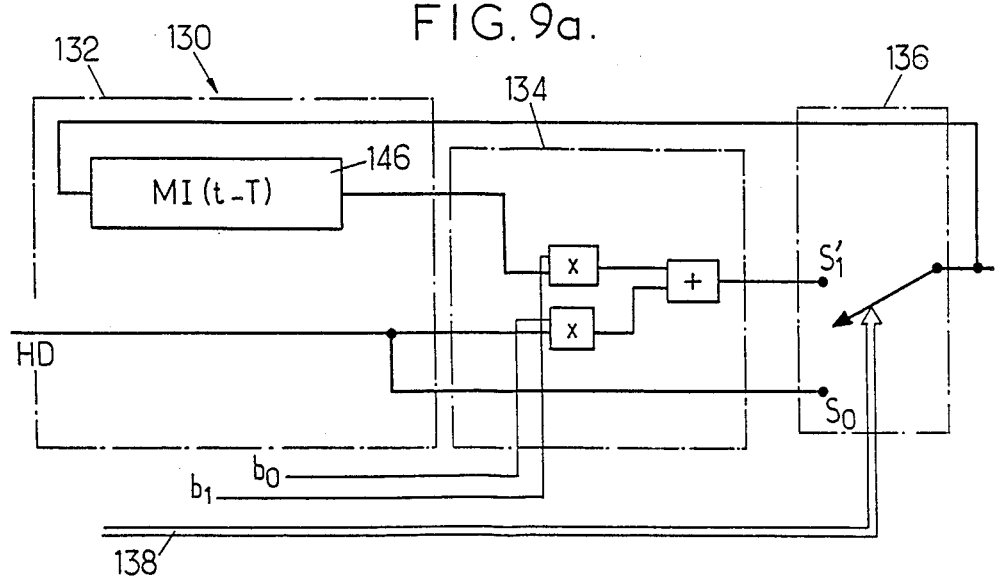
Figure 9:
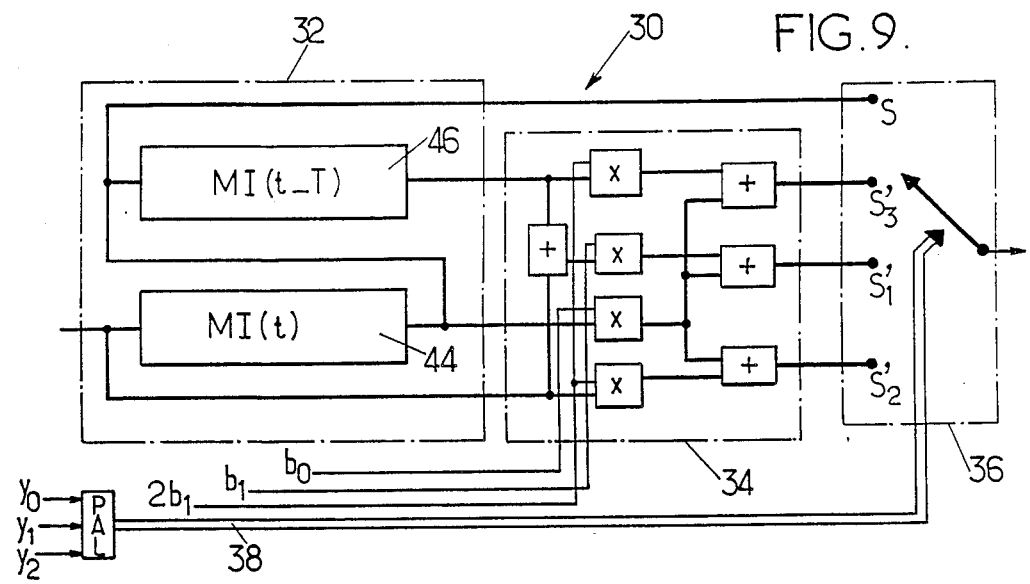

The modification of the invention shown in FIGS. 8a and 9a (where the elements corresponding to those of FIGS. 8 and 9 are designated by the same reference number increased by 100) uses:

a transverse attenuation filter at emission, and a recursive enhancement filter at reception.
The time aperture may then be reduced to one image.
The attenuation is then written:

$$I_t(x,y,t) = a_0 I_0(x,y,t) + a_{-1} I_0(x,y,t-T) \quad (1\ bis)$$ in which:

$I_0(x,y,t)$: initial value at the point of coordinates (x,y) at time t, $I_t(x,y,t)$ value transmitted after attenuation for point (x,y) at time t, with a = value of the attenuation for ft.
Then the values $a_0$ and $a_1$ are:

$$a_0 = (1+a)/2$$

$$a_{-1}(1-a)/2$$

If the value after enhancement at point (x,y) and at time t is designated by $I_r(x,y,t)$ the enhancement to be effected will be:

$$I_r(x,y,t) = b_0 I_t(x,y,t) + b_{-1} I_r(x,y,t-T)$$

with
$b_0 = (1+a)/2.a$ $b_{31\ 1} = (a-1)/2.a$ with $a = 0.5$:

$a_0 = 0.75$ $a_{-1} = 0.25$ $b_0 = 1.5$ $b_{-1} = -0.5$

If the equation (1 bis) is adopted for sequences having low time activity, corresponding typically to movements of about the size of a pixel from one image to the next, or less, it is possible to use, with the same symbols as for (1 bis), for the first image at the beginning of a low activity sequence:

$$a'_0 = 1 b'_0 = 1$$
$$a'_{-1} = 0 b'_{-1} = 0$$

In this modification, module 20 comprises a single image memory 122 (FIG. 8a) which will be described in greater detail later, corresponding to the time aperture of the attenuation filters 124 which follow the memories.

The enhancement module 130 then comprises a single image memory 132 (FIG. 9a) and a switching circuit 36 which handles the edge effects and the inadequate time activity cases, by means of the movement data.

FIG. 8a shows the construction of the different components of the attenuation module 20 in the above-mentioned case of attenuation using a single memory. The video memory 122 comprises a RAM 142 assigned to the image at time t-T (T being the repetition period of the even or uneven frames). The digital attenuation filter 124 uses pixel-to-pixel correspondance in two successive temporal planes. It is formed of adders and multipliers in an arrangement providing weighting, which will be described further on.

Thus, the output $S_1$ and $S_0$ correspond to different time attenuations.

$S_1$: attenuation without edge effect.

This signal results from summing the signals taken at times $t-T$ and t, weighted by the respective coefficients $a_1$ and $a_0$.

$S_0$ zero attenuation at the beginning of a sequence (non processed signal).

The switching circuit 126 may be regarded as a switch for connecting the output of the attenuator to one or other of the outputs $S_1$ and $S_0$, depending on the movement date 128 delivered by the encoder.

The enhancement module (FIG. 9a) has a construction similar to that of the attenuation module: it also comprises, due to the time aperture of the enhancement filter, a single video memory 146 which stores the preceding result, at $t-1$. Enhancement filter 34 carries out the same computing operations as the attenuator, but with different weighting coefficients $b_0$, $b_{-1}$ and on different signals. Switch 136 further provides switching between the computed signals and the original transmitted signal $S_0$, depending on movement data 138 delivered by the decoder: this data is computed as in the encoder.

The table of switching operations 26 and 36 may be the following:

|  | Beginning | Stabilized |
| --- | --- | --- |
| Encoder output | $S_0$ | $S_1$ |
| Decoder output | $S_0$ | $S'_1$ |

Figure 11:
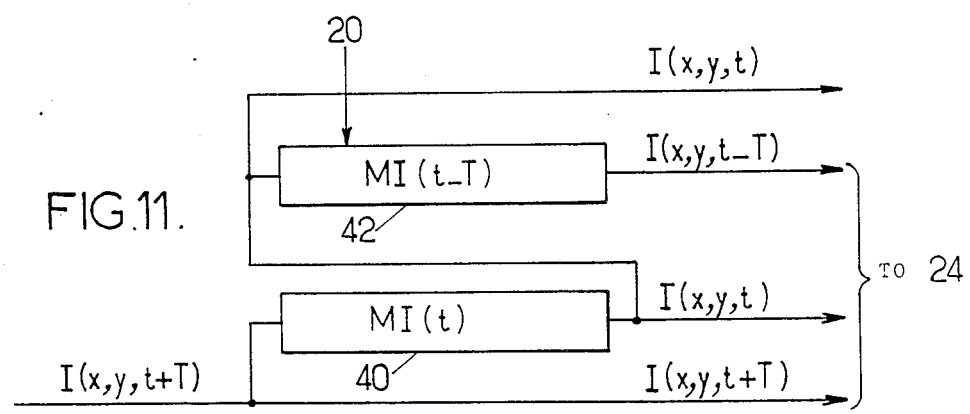
FIG. 11 is a diagram showing the function of the image memories in the module of FIG. 8.

The sequential operation of the modules of FIGS. 6 to 9 will now be described with reference to the indications shown in FIGS. 11 and 12 and to the following notations: each image or frame will be identified by its time coordinate t. Each line will be identified by a spatial ordinate y. Each pixel of a line will be identified by a spatial abscissa x. A pixel of the image is consequently defined as I(x,y,t), I designating the luminance (although the invention applies just as well to the chrominance).

The following description concerns the attenuation. But it is sufficient to substitute $a_o$ and $b_o$, $a_1$ and $b_1$ for them to concern the enhancement.

The original current pixel (x,y,t+T) is applied at the input of the system and the value I representing its intensity is stored in the memory 40 storing image MI (t) and is directed out of the video memory 22. At the same time, the value of the intensity I at pixel (x,y,t) passes from the image memory MI (t) to the image memory 42 MI (t−T) and out of the video memory. Again at the same time, the value I of the pixel (x,y,t−T) leaves the video memory 20.

In the case of 50 Hz frequency (European standard), then T = 1/25 sec.

The filter 24 must compute three values:

(a) During stabilized time activity:

$$P_o(x,y,t) = a_0 I(x,y,t) + a_1 I(x,y,t+T) + a_{-1} I(x,y,t-T)$$

which may be written, since $a_{-1} = a_1$:

$$P_o(x,y,t) = a_0 I(x,y,t) + a_1 [I(x,y,t+T) + I(x,y,t-T)]$$

(b) At the beginning of a sequence:

$$P_1(x,y,t) = a_0 I(x,y,t) + 2a_1 I(x,y,t+T)$$

(c) At the end of a sequence:

$$P_2(x,y,t) = a_0 I(x,y,t) + 2a_1 I(x,y,-T)$$

The above operations are carried out in parallel. Switching by 26 (or by 36) is controlled by the movement indicating data delivered by the HD encoder in phase with the current computed pixel (x,y,t).

I claim:

1. A process for broadcasting an HDTV picture over a transmission channel having a frequency band narrower than that necessary for direct transmission of the HDTV picture, comprising the steps of:
   sub-sampling an HDTV source picture at an analysis image frequency of for distributing the spatial data of each HDTV image of the source picture over a plurality n of successive frames, n being an integer greater than 1,
   subjecting the resulting samples to temporal energy attenuating filtering in a frequency range around f0/n to obtain a modified signal, whereby some energy remains in said frequency range.
   sending said modified signal over said transmission channel,
   and, upon reception of said modified signal, subjecting said modified signal to further temporal filtering for enhancing energy in said frequency range before subjecting it to decoding for restoring said HDTV picture,
   whereby an improved compatible image may be obtained by omitting energy enhancement upon reception.

2. A process according to claim 1, wherein said temporal energy attenuation and temporal energy enhancement consists of raised cosine filtering.

3. A process according to claim 2, wherein said temporal energy attenuating filtering is over three successive frames of the HDTV source picture.

4. A process according to claim 1, wherein said temporal energy attenuating filtering is selected for providing an amount of attenuation of from 5 to 10 db at frequency $f_o/n$, with $f_o$ being the analysis frame frequency and n the number of frames of the temporal opening of the filtering.

5. A process according to claim 4, wherein said attenuation temporal filtering is such that attenuation at a point of coordinates (x,y) and at an instant t results in a value $I_f(x,y,t)$ which is related to an initial value $I_o$ at the same point and at said instant t by a relation:

$$I_f(x,y,t) = a_0 I_o(x,y,t) + a_{-1} I_o(x,y,t-T) + a_1 I_o(x,y,t+T) \quad (1)$$

where:
T is inverse of the image frequency,
$a_o = (1+a)/2$, and
$a_1 = a_{-1} = (1-a)/4$
a being a predetermined temporal attenuation for frequency $f_o/n$.

6. A process according to claim 1, wherein said temporal energy attenuating filtering is carried out over one image only.

7. A process according to claim 6, wherein said attenuation temporal filtering is such that attenuation at a point $x_i$ and at an instant t results in a value $I_f(x,y,t)$ which is related to an initial value $I_o$ at the same point of the same instant t by a relation:

$$I_f(x,y,t) : a_0 I_o(x,y,t) + a_{-1} I_o(x,y,t-T)$$

where:
T is inverse of the image frequency,
$a_o = 1 + a/2$, and
$a_{-1} = (1-a)/4$
a being a predetermined temporal attenuation for frequency $f_o/n$.

8. A process according to claim 1, wherein beginnings and ends of sequences having a low temporal activity are detected and an attenuation filtering different from that carried out during said sequences is used upon occurrence of such beginnings and ends.

9. A process for broadcasting an HDTV picture over a transmission channel having a frequency band narrower than that necessary for direct transmission of the HDTV picture, comprising the steps of:
   sub-sampling an HDTV source picture at an analysis image frequence for distributing the spatial data of each HDTV image of the source picture over a plurality n of successive frames, n being an integer greater than 1.
   during periods when the HDTV source picture has a time activity lower than a predetermined threshold, subjecting the resulting samples to temporal energy attenuating filtering over a plurality of successive frames of the HDTV source picture in a frequency range around of/n to obtain a modified signal, whereby some energy remains in said frequency range,
   and sending said modified signal over said transmission channel.

* * * * *